United States Patent
Kalinin et al.

(10) Patent No.: US 9,505,424 B2
(45) Date of Patent: Nov. 29, 2016

(54) CHILD'S RIDING VEHICLE WITH STOWABLE PARENT HANDLE

(71) Applicant: MGA Entertainment, Inc., Van Nuys, CA (US)

(72) Inventors: Nikita Kalinin, Los Angeles, CA (US); Eric Fobean, Stow, OH (US); Yuval Caspi, Van Nuys, CA (US)

(73) Assignee: MGA ENTERTAINMENT, Inc., Van Nuys, CA (US)

( * ) Notice: Subject to any disclaimer, the term of this patent is extended or adjusted under 35 U.S.C. 154(b) by 55 days.

(21) Appl. No.: 14/599,466

(22) Filed: Jan. 17, 2015

(65) Prior Publication Data

US 2015/0210307 A1 Jul. 30, 2015

Related U.S. Application Data (60) Provisional application No. 61/931,615, filed on Jan. 25, 2014.

(51) Int. Cl.
| | | |
|---|---|---|
| *B62B 9/20* | (2006.01) | |
| *B62B 7/04* | (2006.01) | |
| *B62B 9/14* | (2006.01) | |

(52) U.S. Cl.
CPC . *B62B 9/20* (2013.01); *B62B 7/04* (2013.01); *B62B 9/14* (2013.01)

(58) Field of Classification Search
None
See application file for complete search history.

(56) References Cited

U.S. PATENT DOCUMENTS

| | | | | |
|---|---|---|---|---|
| 5,106,150 A * | 4/1992 | Litwicki | ................... | B60J 7/106 296/177 |
| 5,441,289 A * | 8/1995 | Spielberger | ............ | A47D 13/04 135/67 |
| 6,042,129 A * | 3/2000 | Simpo | ....................... | B62B 7/04 16/111.1 |
| 6,230,656 B1 * | 5/2001 | Walach | ................ | A01K 1/0236 119/453 |
| 6,446,981 B1 * | 9/2002 | Wise | ....................... | B62B 3/007 280/30 |
| 6,513,817 B2 * | 2/2003 | McCue | ................... | B62B 3/144 280/33.993 |
| 6,692,011 B2 * | 2/2004 | Carlson | ...................... | B62B 5/06 280/655.1 |
| 6,705,628 B2 * | 3/2004 | Kahmann | ................. | B62B 7/06 280/204 |
| 6,991,249 B2 * | 1/2006 | Shapiro | ................... | B62B 1/206 280/47.34 |
| 7,438,022 B2 * | 10/2008 | Mirsky | ................ | A01K 1/0245 119/497 |
| 7,458,337 B2 * | 12/2008 | Callan | .................. | A01K 1/0107 119/165 |
| 7,503,574 B1 * | 3/2009 | Reid | ....................... | B62K 27/04 280/204 |
| 8,118,145 B1 * | 2/2012 | Hamamy | .................. | A45C 5/14 190/18 A |
| 8,523,193 B1 * | 9/2013 | Mucaro | ................... | B62B 5/082 280/7.15 |
| 2003/0222421 A1 * | 12/2003 | Myers | .................. | A47D 13/043 280/87.051 |
| 2007/0267834 A1 * | 11/2007 | Amdahl | ................... | B62B 3/144 280/47.38 |
| 2010/0192870 A1 * | 8/2010 | Wood | .................... | A01K 1/0245 119/496 |
| 2012/0058707 A1 * | 3/2012 | Finwall | ................... | A63H 17/38 446/465 |

* cited by examiner

*Primary Examiner* — John Walters
*Assistant Examiner* — Hilary L Johns
(74) *Attorney, Agent, or Firm* — Intellectual Property Law Offices of Joel Voelzke, APC (57) ABSTRACT

A child's riding vehicle has a handle by which a parent can push and steer the vehicle, as well as a cutout in the roof which defines a handhold by which the parent can walk alongside the vehicle while holding it. The vehicle can be propelled either by the parent pushing via the parent handle or via the parent handhold, or the child can propel the vehicle as a foot-to-floor vehicle. When the handle is not being used, it can be rotated so that it is stowed at least partially within the body and roof support pillars of the vehicle for a clean appearance. A biasing and locking mechanism loosely biases and retains the handle in the stowed position, and automatically locks it into a deployed position.

20 Claims, 11 Drawing Sheets

CHILD'S RIDING VEHICLE WITH STOWABLE PARENT HANDLE

CROSS-REFERENCE TO RELATED APPLICATIONS

This application claims priority from U.S. provisional patent application No. 61/931,615 filed Jan. 25, 2014, which is incorporated by reference as if set forth fully herein.

BACKGROUND OF THE INVENTION

1. Field of the Invention

This invention relates to the field of child's riding vehicles. More particularly, this invention relates to the field a child's riding vehicle with a stowable handle for pushing the vehicle.

2. Description of Related Art

Child's riding vehicles, including foot-to-floor vehicles, are known. Foot-to-floor vehicles are vehicles in which the child sits on or in a seat of the vehicle, and uses his feet against the pavement to propel the vehicle forward.

SUMMARY OF THE INVENTION

An exemplary embodiment of the child's riding vehicle of the present invention and various details thereof are shown in the accompanying figures.

In an exemplary embodiment the child's riding vehicle is a vehicle that can be propelled either by a child's effort, such as in a conventional foot-to-floor vehicle, and/or the vehicle can be pushed by another person. The other person will be generally referred to as the "parent" although the person need not be a parent of the child that is riding in the vehicle.

The vehicle has a handle that can be folded upward or downward into at least two different positions: a stowed position in which the handle folds up neatly and flush with or recessed into, or at least partially within, the body or other part of the vehicle, and thus to some extent visually "disappears" within the vehicle; a first deployed and parent-pushing position at a first height; and optionally a second deployed and parent-pushing position at a second height; and possibly other positions as well. In the exemplary embodiment, when the handle is folded or rotated down and into its stowed position, the handle is loosely retained in that position but can be rotated out of that position; when rotated to the deployed position(s) for use by the parent in pushing the vehicle, the handle automatically locks into that position. From the deployed and locked position(s) a parent activates a locking/unlocking mechanism to allow the handle to be folded to a different position. Because the handle can be deployed and locked at either a first height or a second height, the vehicle is convenient for parents of different heights to use. For example, because men are typically taller than women, the vehicle handle can be locked into a first position that is convenient for the child's father of typical man's height to use, and a second position that is convenient for the child's mother of typical woman's height to use. More generally, the handle could be lockable in additional discrete positions, or could be lockable within a continuous range of positions.

It is generally preferred that the handle be held firmly in the deployed position(s). In contrast, when the handle is in the stowed position, it need not be "hard" lockable into that position. For example, in the exemplary embodiment the locking mechanism also provides a mechanism for loosely holding the handle in the stowed position; when the handle is being rotated out of the stowed position, a biased member rides up a ramp thus gradually compressing a spring, thus providing relatively weak resistance against such rotation, but enough resistance so that the handle does not rotate completely freely. In such a construction the user need not manually manipulate any locking/unlocking mechanism in order to rotate the handle out from its stowed position.

Additionally, the vehicle has two side handholds or handles along the top lateral sides of the vehicle proximate the roof of the vehicle so that a parent can walk along either side of the vehicle while easily holding onto it, and for other uses.

Exemplary embodiments of the invention will be further described below with reference to the drawings, in which like numbers refer to like parts. The drawing figures might not be to scale, and certain components may be shown in generalized or schematic form and identified by commercial designations in the interest of clarity and conciseness.

DETAILED DESCRIPTION OF THE PREFERRED EMBODIMENTS

Figure 1:
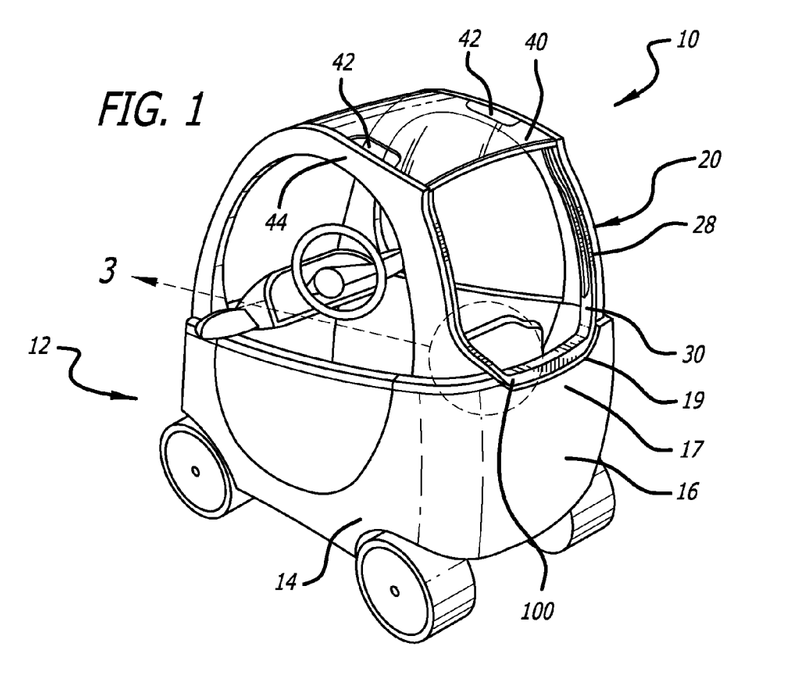
FIG. 1 is a perspective view of a child's riding vehicle 10 according to an exemplary embodiment of the invention.

FIG. 1 is a perspective view of a child's riding vehicle 10 according to an exemplary embodiment. Vehicle 10 includes body 12 having side panel 14, rear panel 16 including rearmost surface 17 of body 12, and roof support or roof pillar 20 supporting roof 40. Rear panel 16 has a recess 19 formed therein to receive handle 30. Roof support 20 has a rearmost surface 28 thereof In the figure, the handle 30 for a parent to use in pushing the vehicle is in the stowed position 100. A pair of side handholds 44 or handles can be seen at the top right and left hand sides of the vehicle in the form of a cutouts 42 in the roof 40 of vehicle 10, the cutouts being located at substantially a longitudinal midpoint of the vehicle. The parent can use cutout 42 and handhold 44 formed thereby to hold vehicle 10 while walking alongside it. Preferably handholds 44 are formed proximate a midpoint of the vehicle. Roof 40 can take the form of a rigid roof panel that is either permanent or removable. Alternatively, the roof can be a removable or retractable fabric panel. Still further, as referred to herein the roof can merely refer to the uppermost extent of the vehicle and/or a portion of the vehicle above the child's head.

Figure 2:
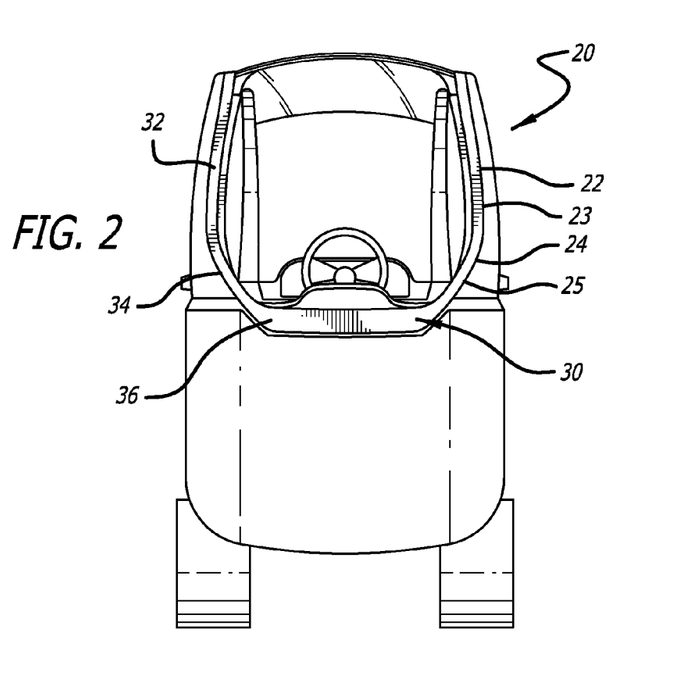
FIG. 2 is a rear elevation view of vehicle 10 of FIG. 1.

FIG. 2 is a rear elevation view of vehicle 10 of FIG. 1. Handle 30 has three main portions: a generally straight and non-angled portion 32, an angled portion 34 that angles inwardly toward the central longitudinal axis of the vehicle, and crossbar 36 for the parent to hold and push. Similarly, roof support 20 has a generally straight and non-angled portion 22 having a recess 23 therein, an angled portion 24 having a recess 25 therein that angles inwardly toward the central longitudinal axis of the vehicle, and rear panel 16 has a recessed portion therein that receives crossbar 36. The crossbar 36 thus resides at least partially within rear panel 16 of the vehicle. As used herein, the non-angled portion 32 is angled less than 10 degrees inwardly relative to a longitudinal axis of the vehicle, i.e., the straight forward direction of travel of the vehicle. Preferably the angled portion 34 is angled between 20 and 70 degrees inwardly relative to the longitudinal axis of the vehicle. Crossbar 36 extends substantially transverse to the vehicle. The roof supports 20 and real panel 16 have correspondingly angled recesses for receiving the different portions 32, 34, and 36 of handle 30, with each recess defined in part by an edge that extends in parallel to the respective handle section respectively received by that recess.

When in its stowed position as shown in FIGS. 1-2, handle 30 resides at least partially between the roof support pillars 20 that support roof 40 of the vehicle, and at least partially within a rear part 16 of the vehicle body below roof support pillars 20. More specifically, a left side arm of the handle is mounted either directly or indirectly to, and resides inwardly of, the left roof support pillar, and a right side arm of the handle is mounted either directly or indirectly to, and resides inwardly of, the right roof support pillar, thereby shielding those handle arms from view when the vehicle is viewed from the sides. In the illustrative embodiment, arms 32 are mounted to respectively inwardly facing surfaces of roof supports 20. Both the roof support pillars 20 and the rear part 16 of the vehicle body have recesses in them into which handle 30 is rotated into stowed position 100, the handle in that position being generally flush with or recessed into and/or between both the roof support pillars 20, and flush with or recessed into the rear part 16 of the vehicle body, thus presenting a clean look when handle 30 is stowed and not being used. That is, the contours of handle 30 including its crossbar 36 generally do not extend farther toward the outward side of the vehicle than do the roof support pillars 20 including their rearmost surfaces 28 and the rear panel 16 of vehicle body 12 including its rearmost surface 17. Thus, in its stowed position the handle does not extend substantially beyond the outer contours of the vehicle.

Figures 3, 4:
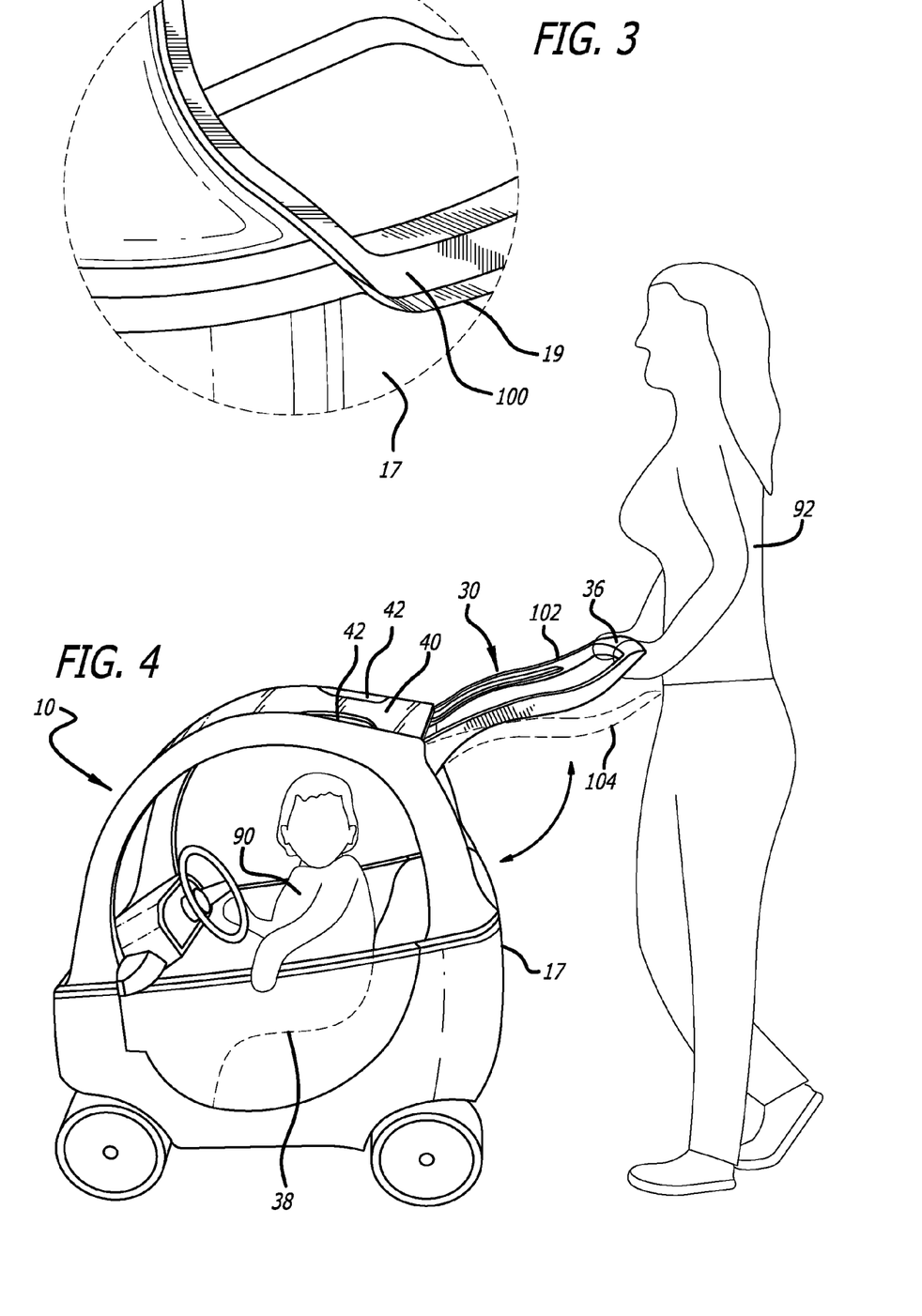
FIG. 3 is a closeup of the area indicated by the circle in FIG. 1.
FIG. 4 is a side perspective view of the vehicle of FIG. 1, showing a child seated in the vehicle and the vehicle being held and pushed by a parent, using the parent handle 30.

FIG. 3 is a closeup of the area indicated by the circle in FIG. 1. In the embodiment shown, in its stowed position 100 handle 30 is slightly recessed into the rearmost surface 17 of the vehicle body, within recess 19 therein.

FIG. 4 is a side perspective view of the vehicle of FIG. 1, showing a child 90 seated on or in seat 38 of vehicle 10, and with the handle 30 including its crossbar 36 in a first deployed position 102 being held and pushed by parent 92. An optional second deployed position 104 is indicated. When the handle is in either of the deployed positions, the parent can push and steer the vehicle from behind, and preferably the handle is positively locked into that position for firm control by the parent.

Figure 5:
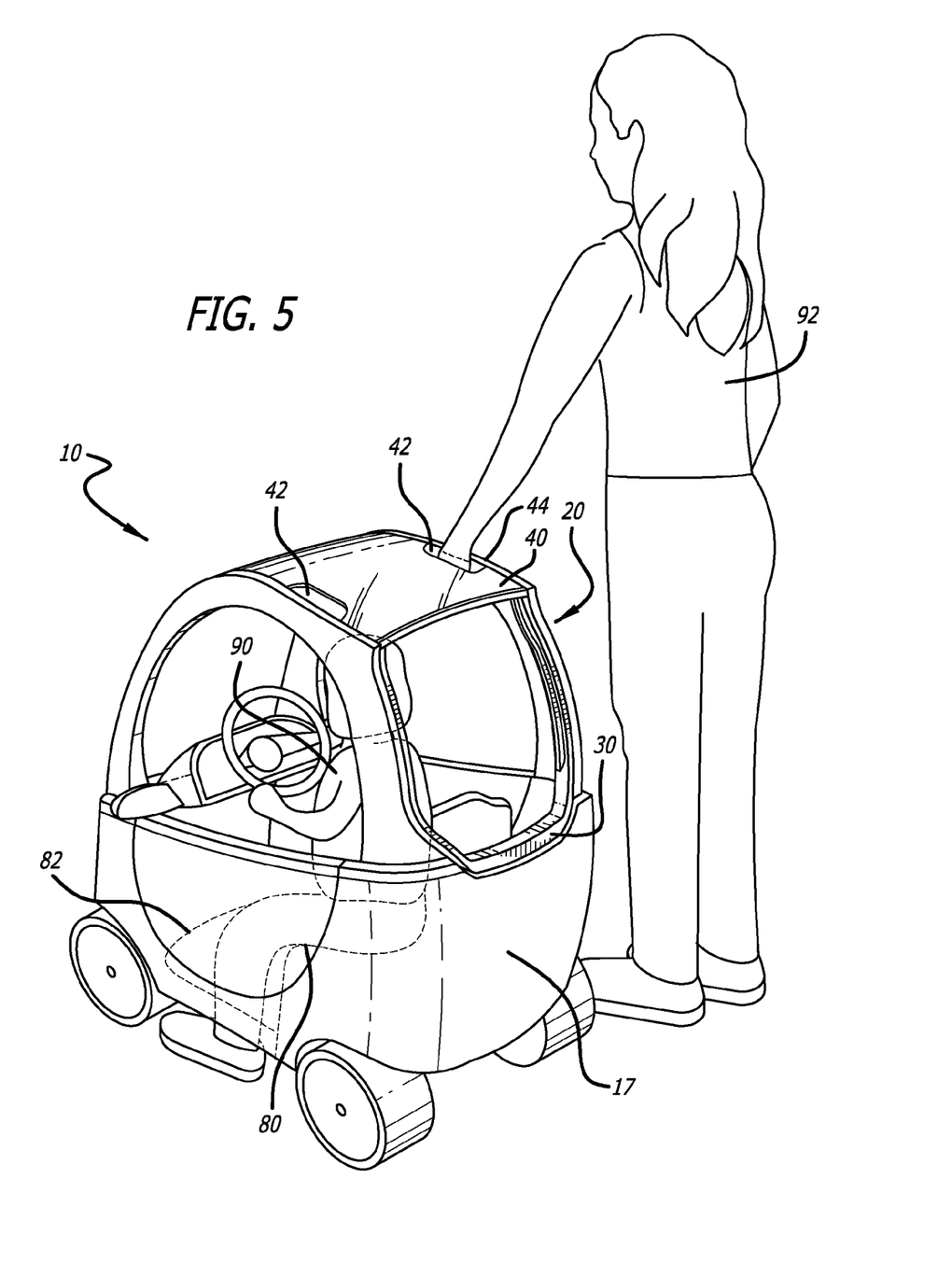
FIG. 5 is a rear perspective view of the vehicle, child, and parent of FIG. 4, with parent handle 30 in its stowed position, and the parent walking beside the vehicle while using handhold 44.

FIG. 5 is a rear perspective view of the vehicle, child, and parent of FIG. 4, with parent handle 30 now in its stowed position and child 90 or other rider extending his feet through cutout(s) 82 in vehicle floor 80 to propel the vehicle in a manner similar to other well known foot-to-floor vehicles. The parent 92 can walk alongside the vehicle holding the vehicle by placing her hand through roof cutout 42 and using the vehicle's roof beam 44 as a handhold. Alternatively, other types of handles could be provided for the parent to grasp as she walks alongside and guides the vehicle.

Figure 6:
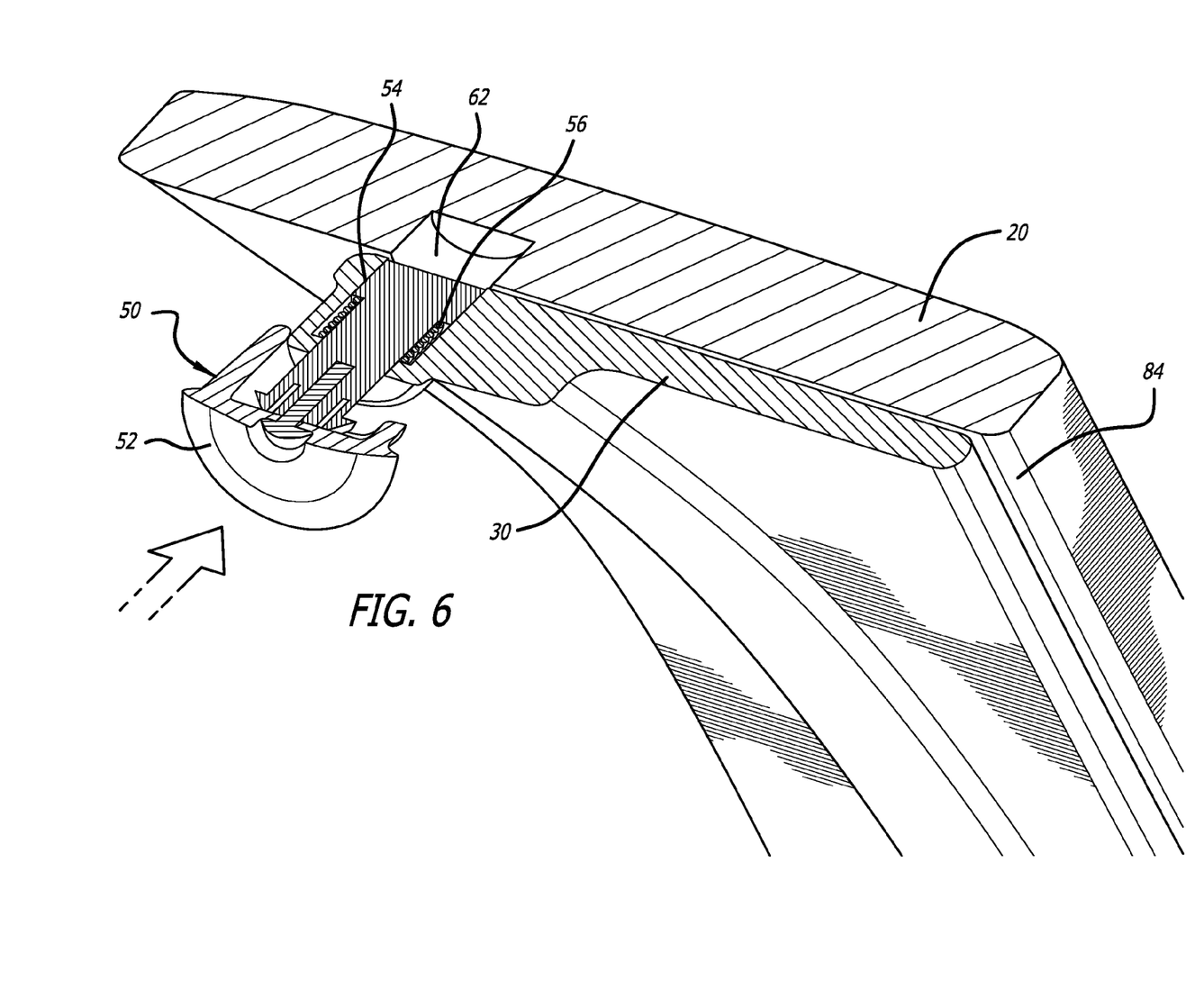
FIG. 6 is a cutaway sectional perspective view of a handle locking mechanism 50 used in the vehicle of FIG. 1, with mechanism 50 in its unlocked position.

FIG. 6 is a cutaway sectional perspective view of a handle locking mechanism 50 used in the vehicle of FIG. 1 according to the exemplary embodiment, with mechanism 50 in its unlocked position. Locking mechanism 50 includes knob 50, locking pin or shaft 54 that slides in and out of corresponding recess or hole 62, and spring 56 that provides a bias force to keep pin 54 biased into hole 62. The mechanism is shown as it would look when a parent or other user has pulled knob 52 thus compressing spring 56 and withdrawing locking pin 54 from hole 62. In this position handle 30 can be freely rotated. The edge of handle 30 is flush with or slightly recessed past edge 84 of roof support pillar 20.

Figure 7:
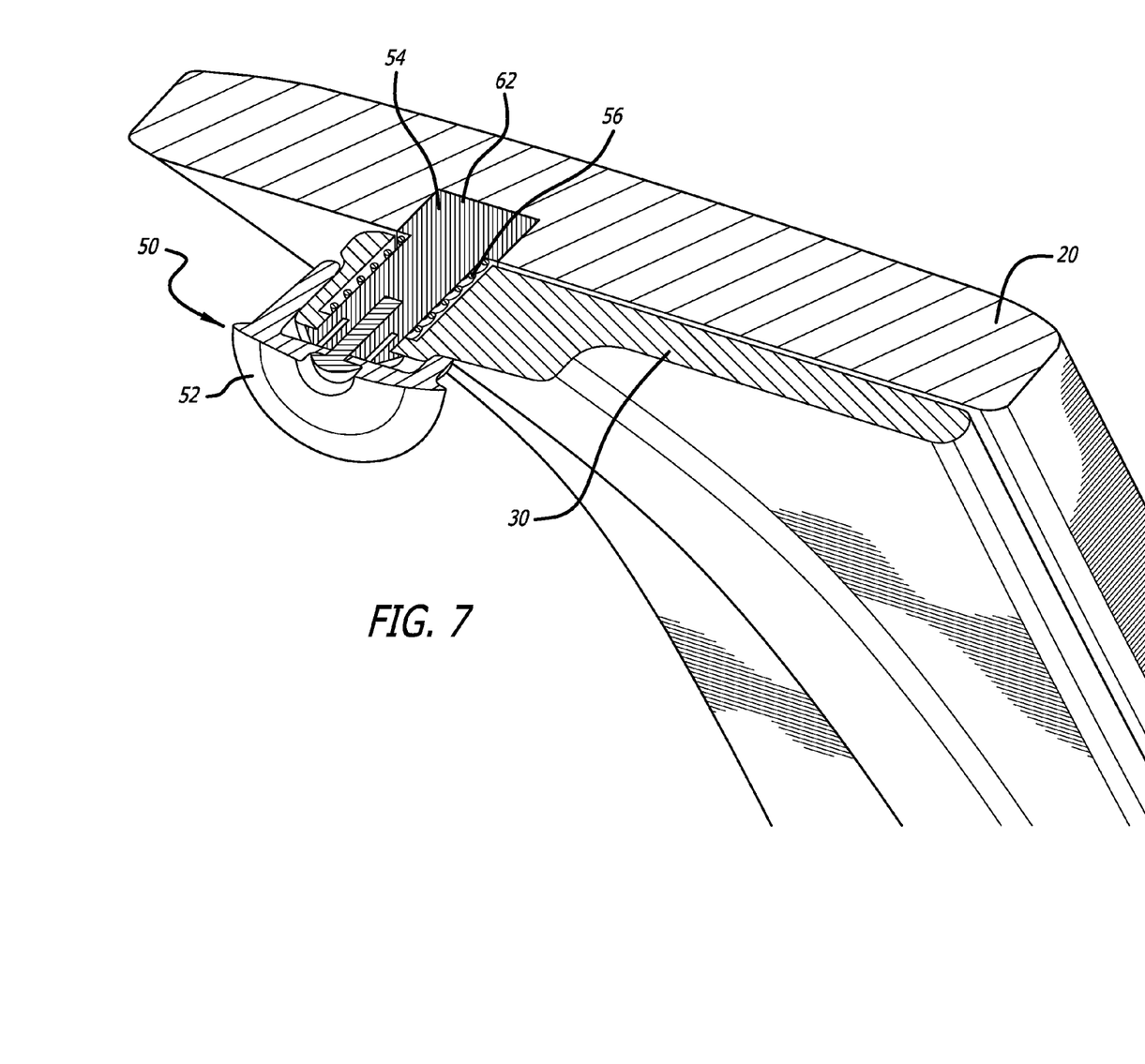
FIG. 7 is a cutaway sectional perspective view of the handle locking mechanism 50 of FIG. 6, with the mechanism in its locked position.

FIG. 7 is a cutaway sectional perspective view of the handle locking mechanism 50 of FIG. 6, with mechanism 50 in its locked position. In this position, the parent is no longer pulling on knob 52, and the bias force of compressed spring 56 has caused locking pin 54 to enter hole 62. Handle 30 will be positively locked into that position until a user pulls knob 52 inwardly again.

Figure 8:
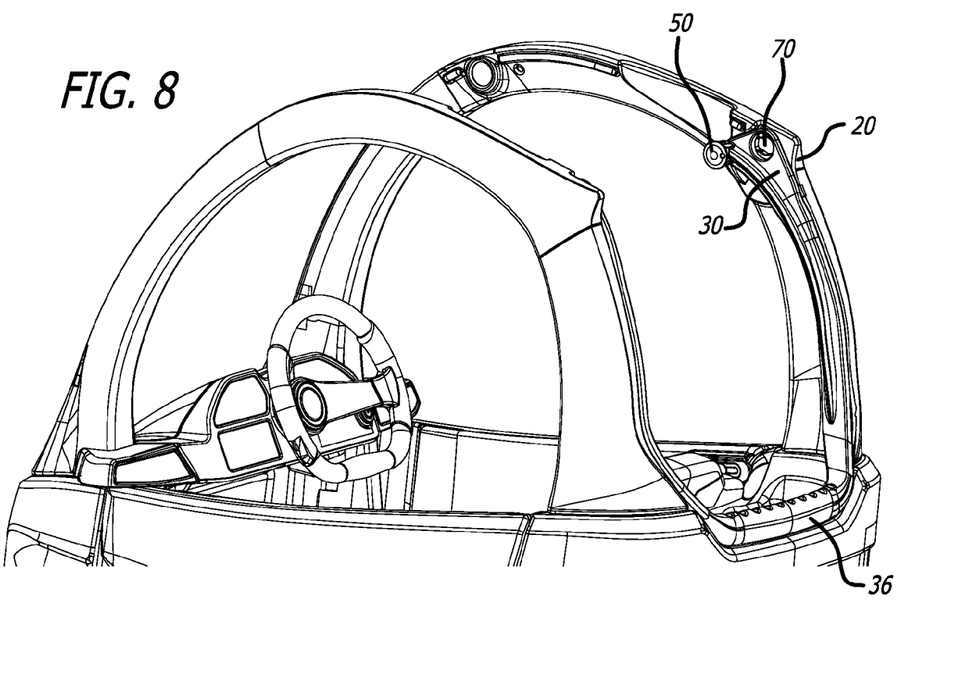
FIG. 8 is a rear perspective views of the vehicle of FIG. 1 with the roof 40 and other components removed in order to reveal details of handle 30 and its connection to the vehicle.
Figure 9:
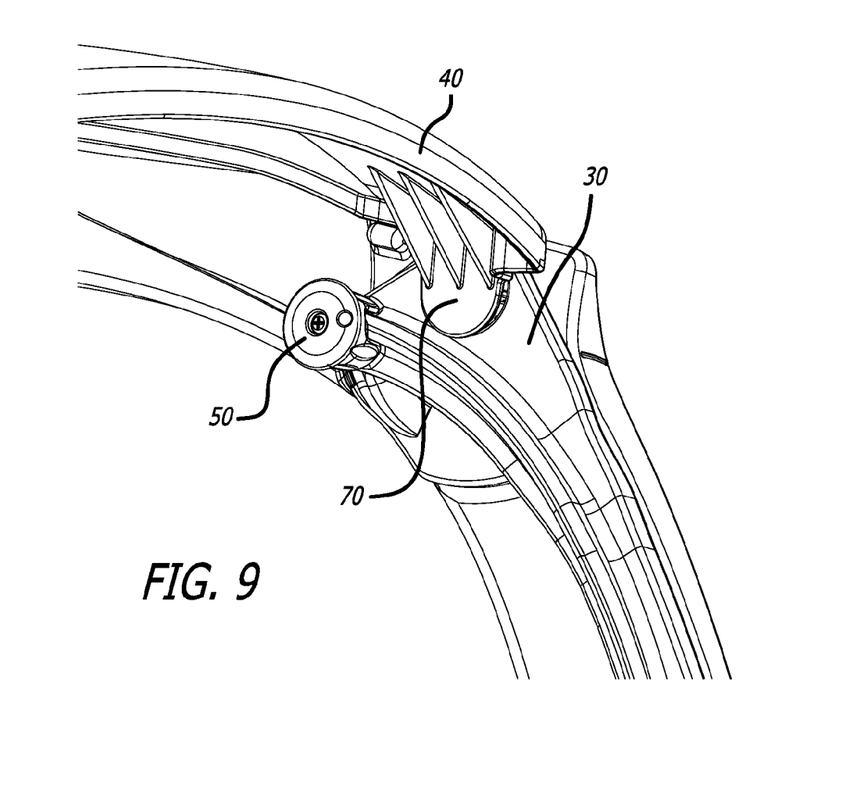
FIG. 9 is a closeup of the upper rear left corner of the vehicle of FIG. 8 with roof 40 present.

FIGS. 8 and 9 are rear perspective views of the vehicle of FIG. 1 with roof 40 and/or other components removed in order to reveal details of handle 30 and its connection to the vehicle. Handle 30 rotates about hinge 70, and is locked or biased into a particular position by locking mechanism 50.

Figure 10:
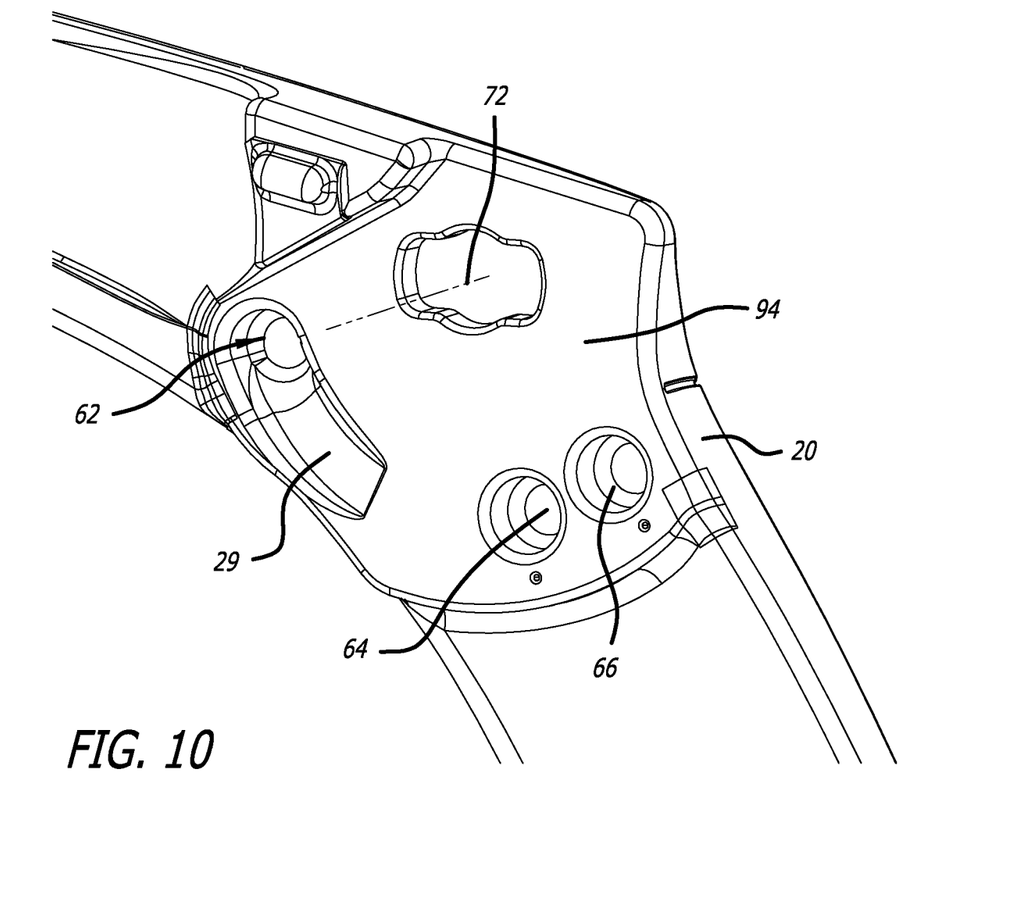
FIG. 10 is a perspective view of area in which roof support pillar 20 meets roof 40, with the handle 30 and certain components of locking mechanism 50 and hinge 70 removed for clarity of illustration.

FIG. 10 is a perspective view of area in which roof support pillar 20 meets roof 40, with the handle 30 and certain components of locking mechanism 50 and hinge 70 removed for clarity of illustration. Plate or insert 94 includes a hole therethrough that defines pivot axis 72 about which hinge 70 (and hence handle arm 32) pivots, and further includes first hole 62 for the parent handle's stowed position, second hole or recess 66 for the parent handle's first deployed position 102, and optionally third hole or recess 64 for the parent handle's second deployed position 104. The arm handles 32 are thus mounted indirectly to the roof support pillars in this embodiment. The features formed into plate 94 could alternatively be formed into roof support pillar 20, the roof support beam, and/or roof 40 directly, such that handle arms 32 would mount directly to the roof support pillars 20. However, in the exemplary embodiment those features are formed in separately formed plate 94 for ease of manufacture and assembly.

A ramp 29 leads to and away from first hole 62. When locking pin 54 is pressed into first hole 62 by the bias force of spring 56, applying a rotational force against handle 30 causes locking pin 54 to slide up the ramp 29, thus gradually compressing spring 56 further. In this way, the handle 30 can be rotated from its stowed position, by applying a slight force thereto. The handle does not rotate completely freely from its stowed position, and thus does not flop around freely from its stowed position.

Other mechanism for weakly or positively locking the handle into one of a stowed position and one or more deployed positions could be used. For example, in an alternative construction of a loosely retaining mechanism, the side of the handle could have a projecting bubble on it, and the frame could have a corresponding concave depression in it, with either the bubble and/or the depression being of a resilient plastic and the bubble fitting into the depression in the stowed position, such that the handle clicks weakly into the stowed position yet can be deployed from that position by applying a moderate force to the handle.

Once the handle has been rotated away from the stowed position, when the handle is brought to first deployed position 102 such that locking pin 54 aligns with hole 64, the bias force provided by spring 56 automatically presses locking pin 54 into hole 64, thus automatically locking handle 30 into the second deployed position 104. The handle 30 is thus automatically locked into the deployed position merely by rotation of the handle.

Figure 11:
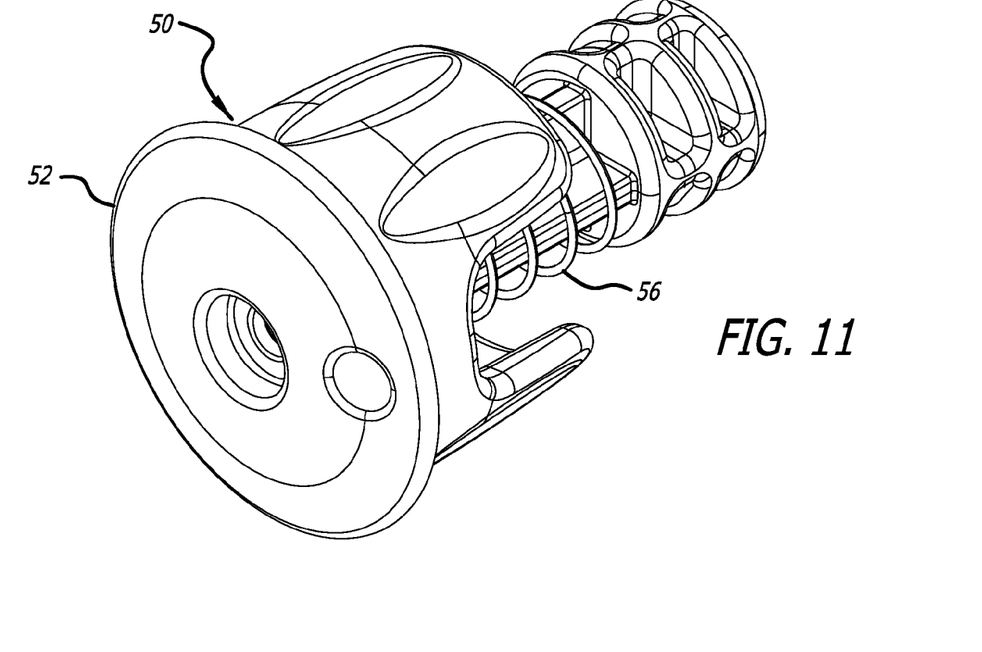
FIGS. 11 and 12 are perspective views of just the locking mechanism 50 of FIG. 6.
Figure 12:
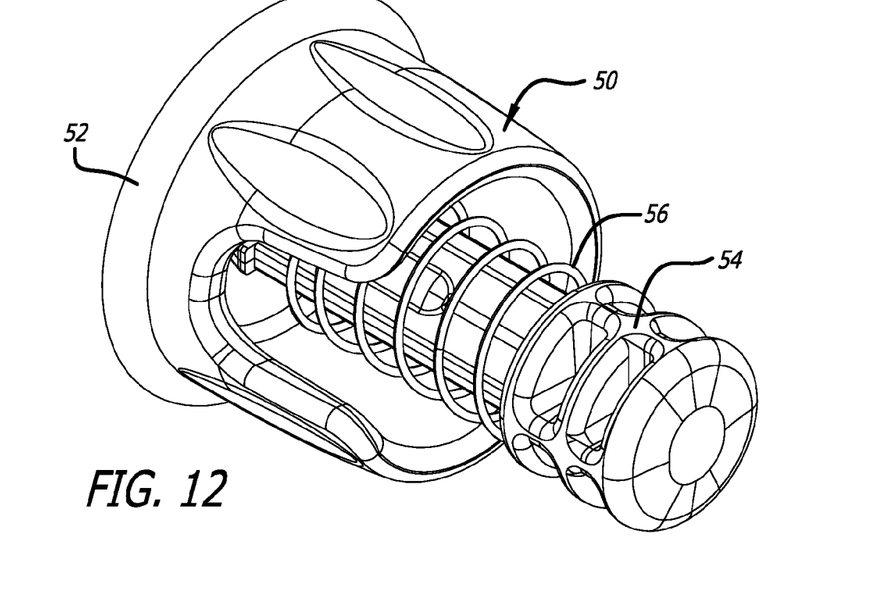

FIGS. 11 and 12 are perspective views of just the locking mechanism 50 of FIG. 6, revealing additional details of that mechanism.

Figure 13:
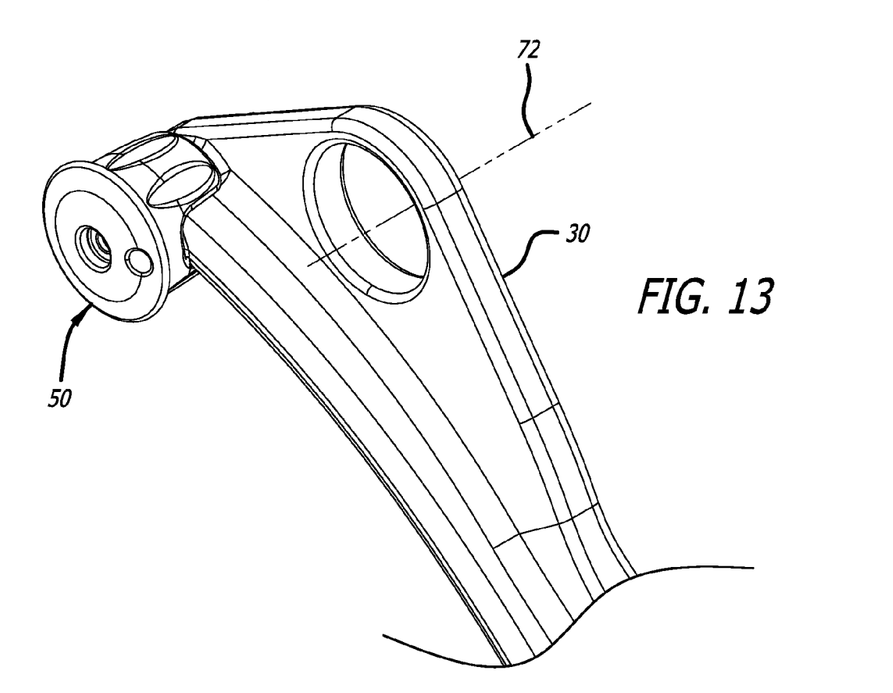
FIGS. 13 and 14 are perspective views of just the locking mechanism 50 and the arm of handle 30.
Figure 14:
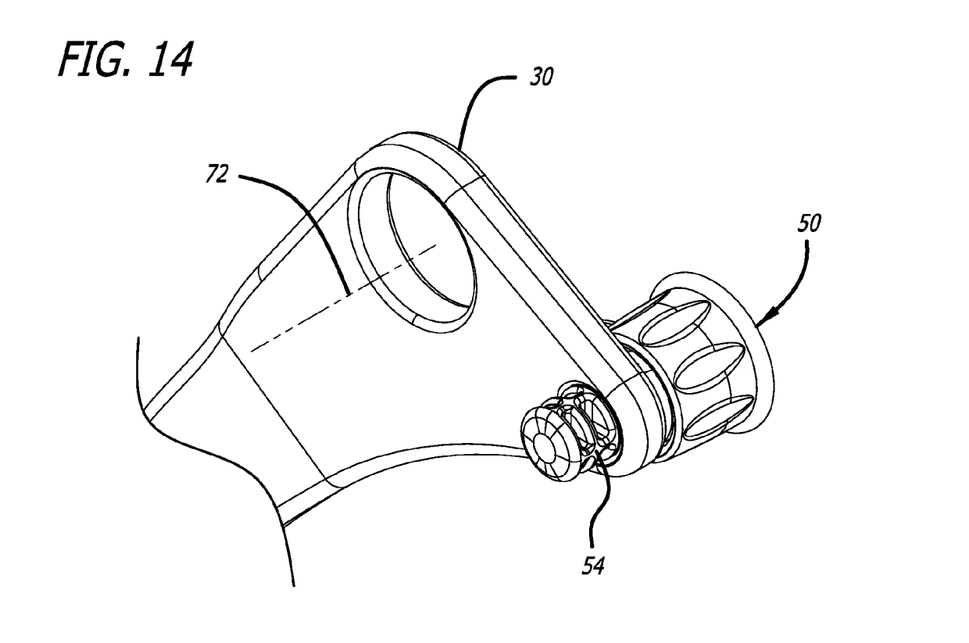

FIGS. 13 and 14 are perspective views of just the locking mechanism 50 and the arm of handle 30, showing additional details of how locking mechanism 50 couples to handle 30.

Figure 15:
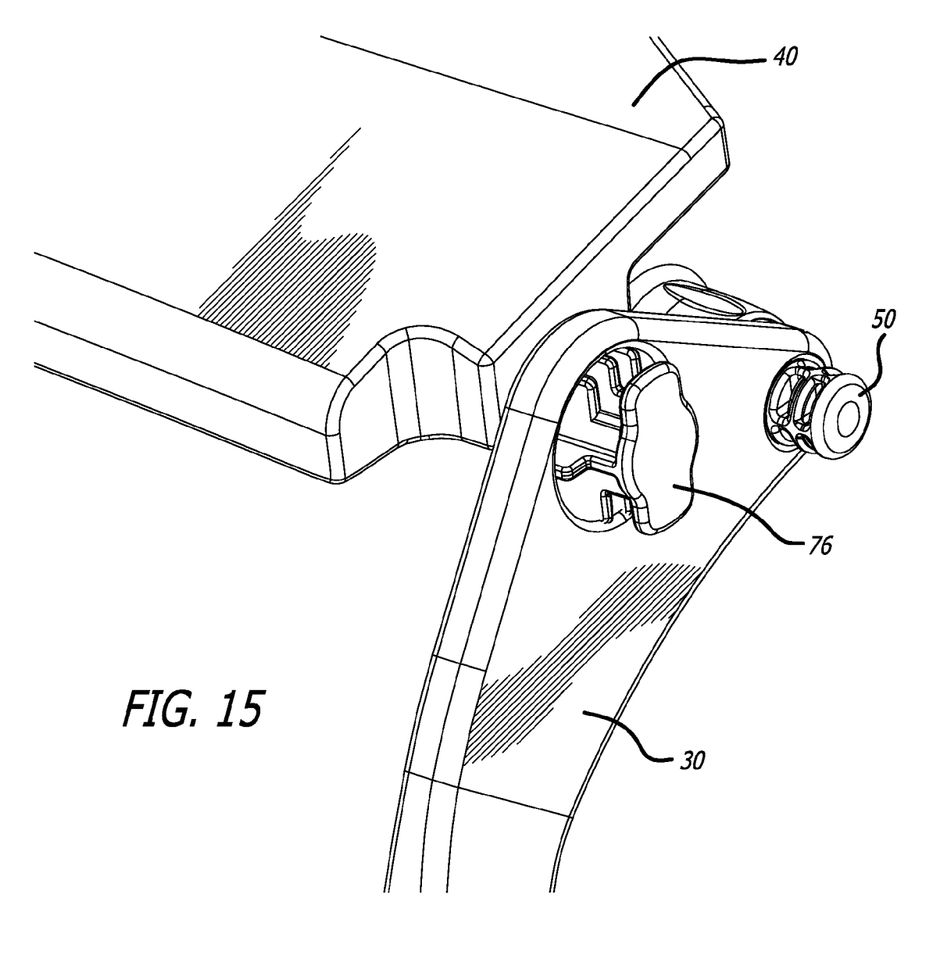
FIG. 15 is a perspective view showing details of the connection between handle 30 and roof 40.

FIG. 15 is a perspective view showing details of the connection between handle 30 and roof 40. Hinge 70 includes hinge flange 76 that retains the handle to roof 40.

Figure 16:
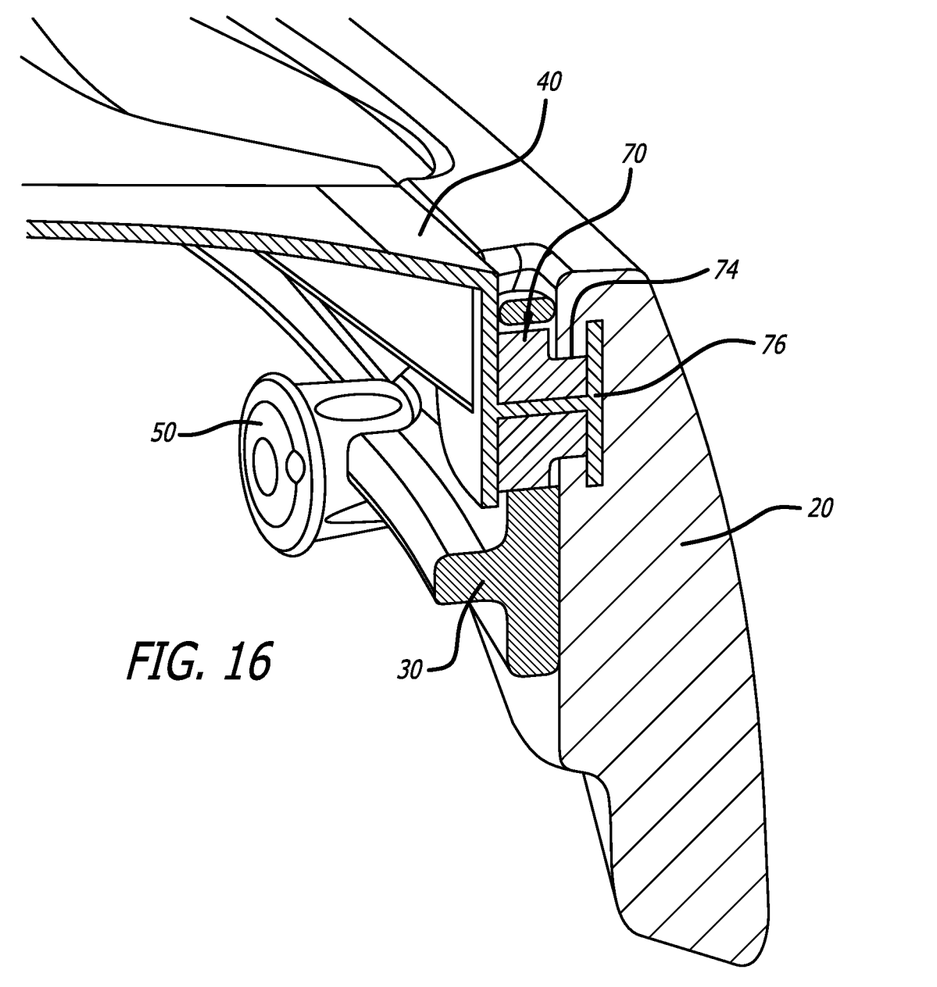
FIG. 16 is a perspective cutaway view showing details of the connections among roof support 20, handle 30, and roof 40.

FIG. 16 is a perspective cutaway view showing details of the connections among roof support 20, handle 30, and roof 40. Hinge 70 includes hinge barrel 74 and hinge flange 76.

It will be understood that the terms "generally," "approximately," "about," "substantially," and "flush" as used within the specification and the claims herein allow for a certain amount of variation from any exact dimensions, measurements, and arrangements, and that those terms should be understood within the context of the description and operation of the invention as disclosed herein.

All features disclosed in the specification, including the claims, abstract, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent, or similar purpose, unless expressly stated otherwise. Thus, unless expressly stated otherwise, each feature disclosed is one example only of a generic series of equivalent or similar features.

It will be appreciated that the term "present invention" as used herein should not be construed to mean that only a single invention having a single essential element or group of elements is presented. Similarly, it will also be appreciated that the term "present invention" encompasses a number of separate innovations which can each be considered separate inventions. Although the present invention has thus been described in detail with regard to the preferred embodiments and drawings thereof, it should be apparent to those skilled in the art that various adaptations and modifications of the present invention may be accomplished without departing from the spirit and the scope of the invention. Accordingly, it is to be understood that the detailed description and the accompanying drawings as set forth hereinabove are not intended to limit the breadth of the present invention, which should be inferred only from the following claims and their appropriately construed legal equivalents.

We claim:

1. A parent steerable child's riding vehicle comprising:
   a vehicle body having a seat for the child to ride on or in; and
   a handle for a parent to push the vehicle from behind;
   a hinge about which the handle can rotate; and
   a locking mechanism for locking the handle in at least one deployed position in which the parent can conveniently grasp the handle and push the vehicle from behind while the child is riding on or in the seat.
   wherein the handle can be rotated into one of at least a first and stowed position in which the handle is substantially flush with or recessed into outer contours of the vehicle, and the at least one deployed position.

2. The child's riding vehicle of claim 1 wherein the at least one deployed position comprises at least a first deployed position and a second deployed position, the handle being located at different heights in the first and second deployed positions, respectively.

3. The child's riding vehicle of claim 1 further comprising a bias mechanism for loosely holding the handle in the stowed position, and an automatic locking means for allowing the handle to be rotated from the stowed position and to be locked into the deployed position merely by rotation of the handle.

4. The child's riding vehicle of claim 3 wherein the bias mechanism and the automatic locking means collectively comprise:
   a locking pin that is biased by a bias force into a first recess corresponding to the stowed position;
   a ramp extending away from the first recess, rotation of the handle causing the locking pin to move up the ramp against the bias force; and
   a second recess corresponding to the first deployed position, the bias force causing the locking pin to enter the second recess when the pin becomes aligned therewith.

5. The child's riding vehicle of claim 1 wherein:
   the vehicle has a left side roof support pillar and a right side roof support pillar;
   the handle has a left side arm and a right side arm; and
   when the handle is in its stowed position, the left and right side handle arms are disposed inwardly of the left and right side roof support pillars, respectively thereby shielding those handle arms from view when the vehicle is viewed from its sides.

6. The child's riding vehicle of claim 1 wherein the vehicle has an opening in its bottom through which a child riding within or on the vehicle can propel the vehicle using his feet.

7. The child's riding vehicle of claim 6 wherein the vehicle further has a handhold formed proximate a roof of the vehicle suitable for a parent to grasp and thereby control the vehicle when walking beside the vehicle.

8. The child's riding vehicle of claim 7 wherein the handhold is defined at least in part by a cutout in the roof of the vehicle.

9. The child's riding vehicle of claim 1 wherein the vehicle has a roof and at least two roof support pillars, and wherein when the handle is in its stowed position the handle resides at least partially between the roof support pillars.

10. The child's riding vehicle of claim 9 wherein when the handle is in its stowed position, a crossbar of the handle resides at least partially within a rear panel of the vehicle below the roof support pillars.

11. The child's riding vehicle of claim 10 wherein when the handle is its stowed position, the handle lies flush with the roof support pillars and flush with or recessed into the rear panel of the vehicle below the roof support pillars.

12. The child's riding vehicle of claim 1 wherein the handle comprises:
 a first section which is angled less than 10° inwardly; and
 a second section which is angled between 20° and 70° inwardly; and
 a third section defining a crossbar which extends substantially transverse to a forward direction of travel of the vehicle;
 and wherein the vehicle has corresponding first, second, and third recesses for receiving the first, second, and third handle sections, respectively, each recess defined in part by an edge that extends in parallel to the respective handle section respectively received by that recess.

13. A parent steerable child's riding vehicle comprising:
a vehicle body having a seat for the child to ride on or in, the vehicle body having a rear panel, the rear panel having a rearmost surface;
a roof;
a pair of roof supports supporting the roof, the roof supports having respective rearmost surfaces thereof; and
a handle comprising:
 handle arms pivotally attached to at least one of the roof and the roof supports; and
 a crossbar extending between the handle arms;
wherein:
 when the handle is pivoted to a stowed position, the crossbar does not extend more rearwardly than the rearmost surface of the rear panel, and the handle arms do not extend beyond the rearmost surfaces of the roof supports; and
 when the handle is pivoted to a deployed position, the handle extends past a rear of the vehicle at a height that is suitable for a parent to conveniently grasp the handle and push the vehicle front behind.

14. The child's riding vehicle of claim 13 wherein the roof has a cutout therein that defines a parent handhold suitable for the parent to grasp as the parent walks alongside the vehicle.

15. The child's riding vehicle of claim 13 further comprising locking means for positively locking the handle in a deployed position in which it is rotated away from the vehicle body, and at least loosing retaining the handle in the stowed position.

16. The child's riding vehicle of claim 13 wherein when the handle is rotated to its stowed position, the handle arms are disposed inwardly of the roof supports.

17. A child's riding vehicle comprising:
 a vehicle body having a seat for the child to ride on or in; and
 a handle for a parent to push the vehicle from behind in a parent propelled mode;
 a hinge for allowing the handle to be rotated to:
  a deployed position in which the handle extends away from the vehicle and past a rear of the vehicle body and the parent can conveniently grasp the handle and use the handle to push the vehicle from behind and to steer the vehicle while the child is riding on or in the seat; and
  a stowed position in which the handle is rotated to a position against the vehicle;
 a floor having an opening therein for the child to propel the vehicle in a foot-to-floor manner in a child propelled mode; and
 a handhold proximate a longitudinal midpoint of the vehicle suitable for the parent to grasp and to control the vehicle when the child is propelling the vehicle.

18. The child's riding vehicle of claim 17 wherein the vehicle has a roof, and the handhold is defined by a cutout in the roof substantially at a longitudinal midpoint thereof.

19. The child's riding vehicle of claim 17 wherein when the handle is in its stowed position, the handle does not extend substantially rearward of the rearmost extent of the vehicle.

20. The child's riding vehicle of claim 17 wherein:
 the handle comprises a pair of arms and a crossbar extending therebetween;
 the vehicle further comprises a pair of roof supports;
 the arms of the handle are mounted to respectively inwardly facing surfaces of the roof supports; and
 when the handle is in its stowed position, the handle crossbar is disposed in a recess within a rear surface of the vehicle.

* * * * *

UNITED STATES PATENT AND TRADEMARK OFFICE
CERTIFICATE OF CORRECTION

PATENT NO. : 9,505,424 B2
APPLICATION NO. : 14/599466
DATED : November 29, 2016
INVENTOR(S) : Nikita Kalinin et al.

It is certified that error appears in the above-identified patent and that said Letters Patent is hereby corrected as shown below:

In the Claims

In Claim 15, Column 8, Line 8, delete "loosing" and insert --loosely--.

In Claim 17, Column 8, Line 15, delete "and".

Signed and Sealed this
Twenty-fourth Day of January, 2017

Michelle K. Lee
*Director of the United States Patent and Trademark Office*